J. R. BARROWS.
LAWN AND GARDEN HOSE HOLDER.
APPLICATION FILED JUNE 20, 1906.
916,255.
Patented Mar. 23, 1909.
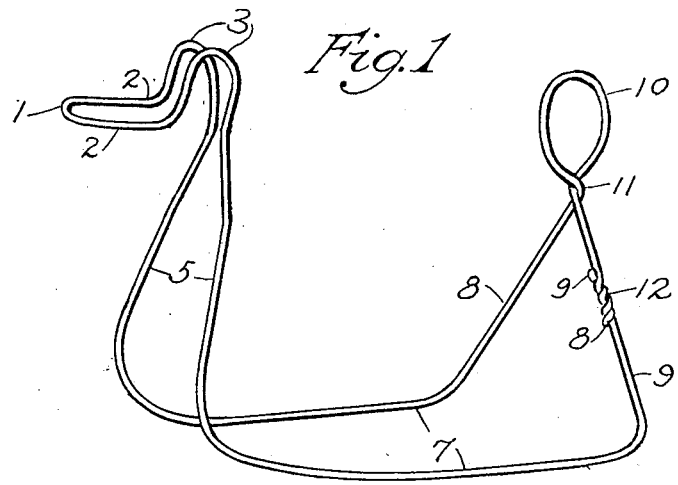
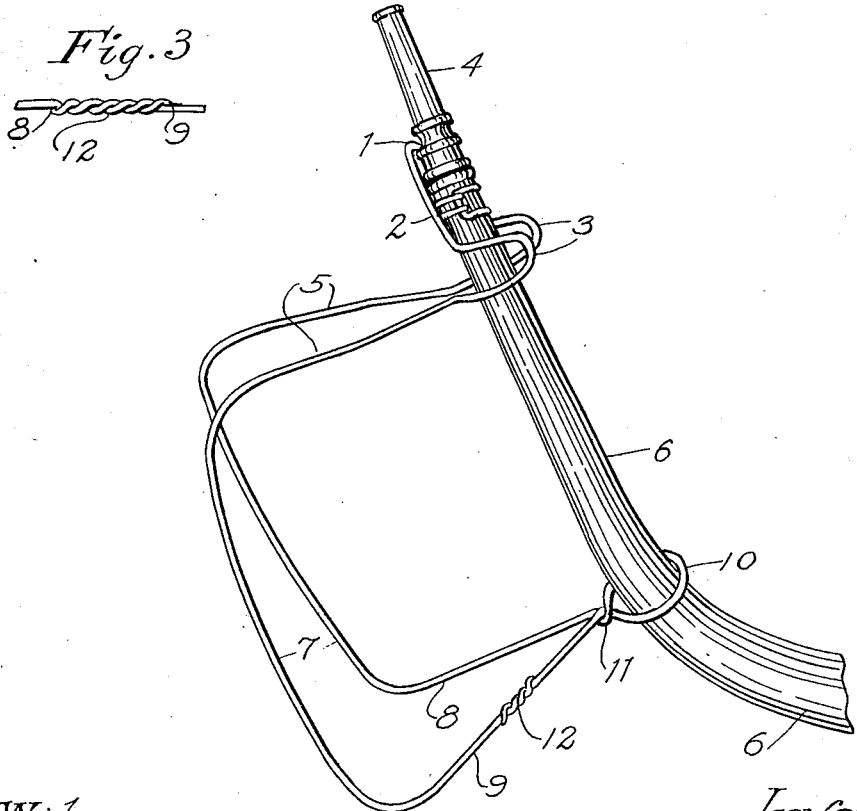
Witnesses
B. W. Pierce
Ida Pierce
Inventor
John R. Barrows
by James R. Rogers
Attorney

UNITED STATES PATENT OFFICE.

JOHN R. BARROWS, OF LOS ANGELES, CALIFORNIA.

LAWN AND GARDEN HOSE HOLDER.

No. 916,255.  Specification of Letters Patent.  Patented March 23, 1909.

Application filed June 20, 1906. Serial No. 322,645.

*To all whom it may concern:*

Be it known that I, JOHN R. BARROWS, a citizen of the United States, residing at Los Angeles, county of Los Angeles, State of California, have invented and discovered a new and useful Improvement in Lawn and Garden Hose Holders; and I do hereby declare the following to be a full, clear, and exact description of the invention, such as will enable others skilled in the art to which it appertains to make and use the same.

This invention relates to improvements in garden and lawn hose holders; and the objects of my improvement are, first, to produce an efficient and inexpensive holder for directing the nozzle of the hose in any desired position; and second, to provide a hose holder of increased adaptability to the many positions desired.

The invention consists essentially in the construction and arrangement of the several parts as will be hereinafter fully described in the specification, shown upon the drawings appended hereto, and specifically pointed out in the claims made a part hereof.

I attain these objects by the construction and arrangement of the several parts illustrated in the accompanying drawings, in which—

Figure 1 is a perspective view of my improved garden and lawn hose holder in a horizontal position, the hose and sprinkler removed therefrom; Fig. 2 is a perspective view of my improvement in an elevated position the hose and sprinkler secured in place thereon for throwing water or other liquid at a distance; and Fig. 3 is a fragmental view showing the manner of securing the ends of the wire together of which the holder is made.

Similar reference numerals and letters refer to like parts throughout the several views of the drawings.

The reference numeral 1, denotes the end or beak of the nozzle or sprinkler support, consisting of returned bends or branches 2, 2, of a single piece of wire of any suitable material and convenient size.

The numerals 3, 3, refer to the supporting hose loops for retaining the hose 6, in position upon the holder—that end of the hose to which the sprinkler or nozzle 4, is attached. I form the said loops 3, 3, of the extensions of the said returned bends or branches 2, 2, of the said single piece of wire from which the nozzle or sprinkler support 1, is made. The said two branches 2, 2, of the single wire are extended vertically downward after forming the loops 3, 3, as shown upon Fig. 1, of the drawings and form the posts 5, 5, connecting the said loops 3, 3, with the rockers 7, 7, of the holder on which the holder slides when drawn rearwardly by the hand of the attendant, the said hose 6, and sprinkler or nozzle 4, being temporarily and removably attached to the holder.

The rear standards 8 and 9, of the holder are extensions of the rockers 7, 7, and pass upwardly therefrom and intersect each other at 11, and are further extended to form the ring hose support 10, through which the hose 6, passes, extending parallel with the said rockers 7, 7, between the said loops 3, 3, outwardly therefrom and resting upon the sprinkler support 1, of the holder. The ends of the standards 8 and 9 are preferably crossed as shown at 11 Figs. 1 and 2 and the ends of the standards are wound tightly upon each other as shown at 12 upon Figs. 2 and 3 of the drawings. I may however solder the ends of the standards 8 and 9, together or secure the ends of the said standards together by forming thereon screw threads and by a screw threaded nut. The standards 8 and 9, being crossed at 11, and firmly held together are sprung outwardly at the juncture 11. The rockers 7, 7, being a continuation of the said standards 8 and 9, and also a continuation of the posts 5, 5, the said rockers and posts are sprung apart, being separated from each other as shown upon Figs. 1, and 2, of the drawings.

From the foregoing description of the different parts of my improved holder, taken in connection with the accompanying drawings, it is thought that the construction, mode of operation, and advantages of my invention will be readily apparent without requiring further extended explanation.

Various changes in the form, proportion, and the minor details of construction may be resorted to without departing from the principle or sacrificing any of the advantages of this invention, and I therefore reserve the right to myself to make such changes as fairly fall within the scope thereof.

It is obvious that many variations and changes in the details of construction and arrangement of my invention would readily suggest themselves to persons skilled in the art, and still be within the spirit and scope of my improvement.

What I do claim as my invention, and desire to secure by Letters Patent, is—

1. A hose-holder having a support for retaining in place the nozzle or sprinkler comprising return bends or branches, loops formed of extensions of the bends or branches extending above the plane of the nozzle or sprinkler-support for retaining the nozzle-end of the hose, rockers, posts connecting the loops and the rockers, a ring-support for holding the hose, standards for connecting the rockers and the ring-support; the ring-support, the standards, the rockers the posts, the loops and the nozzle or sprinkler support being made of a single piece of wire.

2. A new article of manufacture a hose-holder comprising a support for holding in place the sprinkler comprising return branches loops formed of extensions of the branches for retaining the nozzle-end of the hose, rockers, posts connecting the loops and the rockers, a ring-support for retaining the hose, standards for connecting the rockers and the ring-support; the ring-support, the standards, the rockers the posts, the loops and the sprinkler-support being formed of a single piece of wire.

In testimony whereof, I have signed my name to this specification in the presence of two subscribing witnesses.

JOHN R. BARROWS.

Witnesses:
　JAMES R. ROGERS,
　H. H. HUNT.